May 19, 1970     E. T. HERMANN     3,512,245

METHOD OF BONDING METALS AND PRODUCTS PRODUCED THEREBY

Filed Dec. 28, 1964     2 Sheets-Sheet 1

ERNEST T. HERMANN
INVENTOR.
by KATHRYN H. GORDON
CONSERVATOR
BY
Knight & Rodger
ATTORNEYS.

May 19, 1970  E. T. HERMANN  3,512,245
METHOD OF BONDING METALS AND PRODUCTS PRODUCED THEREBY
Filed Dec. 28, 1964  2 Sheets-Sheet 2
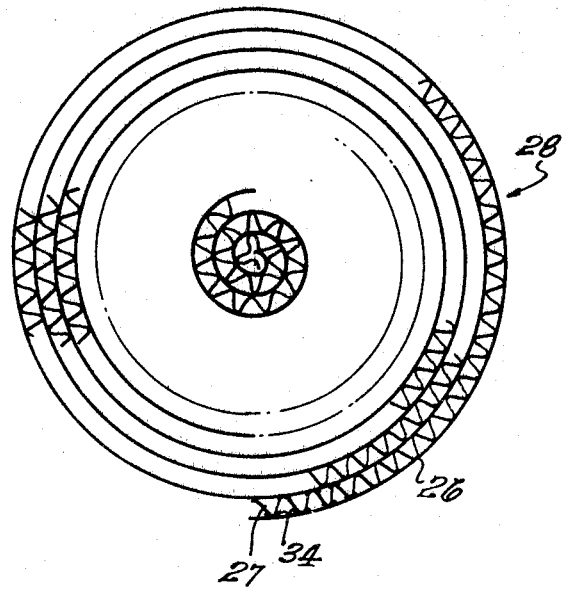
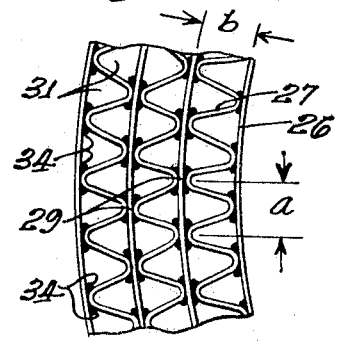
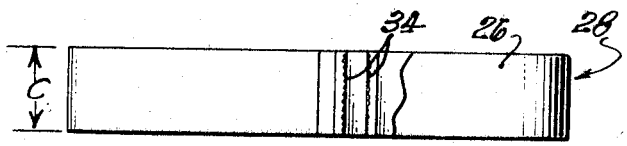
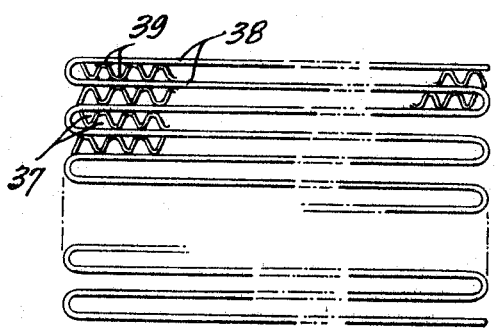
ERNEST T. HERMANN
INVENTOR.
by KATHRYN H. GORDON
CONSERVATOR
BY
ATTORNEYS.

United States Patent Office 3,512,245
Patented May 19, 1970

3,512,245
METHOD OF BONDING METALS AND PRODUCTS PRODUCED THEREBY
Ernest T. Hermann, deceased, late of Pacific Palisades, Calif., by Kathryn H. Gordon, administratrix, 395 Arno Way, Pacific Palisades, Calif. 90272
Filed Dec. 28, 1964, Ser. No. 422,077
Int. Cl. B23k 31/02
U.S. Cl. 29—471.1    12 Claims

ABSTRACT OF THE DISCLOSURE

A method of bonding metal members in a partial vacuum involves vaporizing the bonding metal and subsequently condensing the vapor on the members to be bonded. When solidified, the bonding metal is substantially free of occluded gases. Suitable to metals with high melting point, as iron, chromium and nickel.

---

This invention relates to the bonding of metals, and particularly to a method of bonding metal members by means of a bonding metal that is deposited on the members in molten condition and solidified in contact with the members to bond them together. The invention also includes a new and useful product comprising a screen formed by bonding two metal members together by this process.

The principal object of this invention is to provide a new and advantageous method of bonding metal members together by means of a bonding metal.

Another object is to provide for bonding metal members together at a plurality of positions of contact, and particularly at positions that are not readily accessible for the application of tools, heating means, or bonding materials ordinarily employed in conventional metal bonding methods such as welding, brazing or soldering.

A further object is to provide for bonding metal members together at a plurality of different positions simultaneously and uniformly, and with a minimum of labor or time-consuming manual or mechanical operations.

Another object is to provide a method which is particularly useful and advantageous for bonding metal members by means of a bonding metal having a relatively high melting point, such as chromium, nickel or iron.

A particular object of this invention is to provide a method in which the bonding metal is deposited in molten condition on the members to be bonded and is solidified by cooling in contact with said members, in an atmosphere containing only a very low concentration of oxygen and other gases, thus avoiding or minimizing oxidation of the bonding metal or the metal members themselves, and also avoiding or minimizing occlusion of gases in the bonding metal, thereby causing production of a strong and homogeneous bond.

Another particular object is to provide a satisfactory and economical method of bonding metal members having a high resistance to corrosion or oxidation, by means of a bonding metal also having a high resistance to corrosion or oxidation, such as chromium, cadmium or nickel.

A further object of the invention is to provide a novel type of metal screen having a multiplicity of small openings, with high resistance to corrosion at elevated temperatures, high strength and ability to withstand high pressures, and other advantageous characteristics as described more fully hereinafter.

The method of this invention is characterized by the introduction of the heated vapor of a bonding metal into a region of subatmospheric pressure surrounding contiguous metal members to be bonded, while maintaining said members at a temperature such as to cause the bonding metal vapor to condense in liquid form on the surfaces of said members and then to solidify in contact therewith and thereby bond them together.

In the preferred practice of this method, the metal members to be bonded are placed in an enclosed space, and air is exhausted from such space to create a subatmospheric pressure therein, thereby greatly reducing the concentration of oxygen and other gases in the region surrounding the metal members. The bonding metal is then heated in the enclosed space to a temperature sufficient to create a vapor pressure of said metal at least equal to the pressure in said space. The bonding metal is thus vaporized and the resulting metal vapor is brought into contact with the members to be bonded. These members are also heated to a temperature below their melting point, and such as to cause the bonding metal vapor to condense in liquid form on the surfaces of said members and then to solidify in contact with the members at their positions of contiguity to bond them together.

The method and product of the present invention may be described more particularly with reference to the accompanying drawings, in which:

FIG. 3 is a somewhat enlarged plan view of a metal screen according to this invention and formed by bonding two metal members together by the method described herein;

FIG. 4 is a partly broken away side elevation of the screen structure shown in FIG. 3;

FIG. 5 is a partial plan view of the screen shown in FIG. 3 on a more enlarged scale; and FIG. 6 is a partly broken plan view of another form of screen, on a somewhat enlarged scale.

Figure 1:
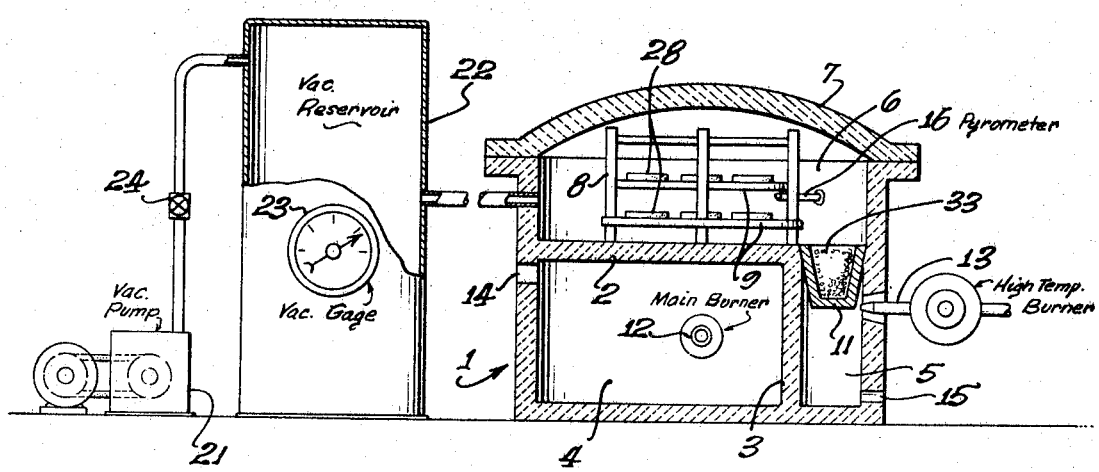
FIGS. 1 and 2 are somewhat schematic views of a form of apparatus suitable for carrying out the method herein described, FIG. 1 being a vertical section with parts shown in side elevation, and FIG. 2 being a partly sectional plan view.
Figure 2:
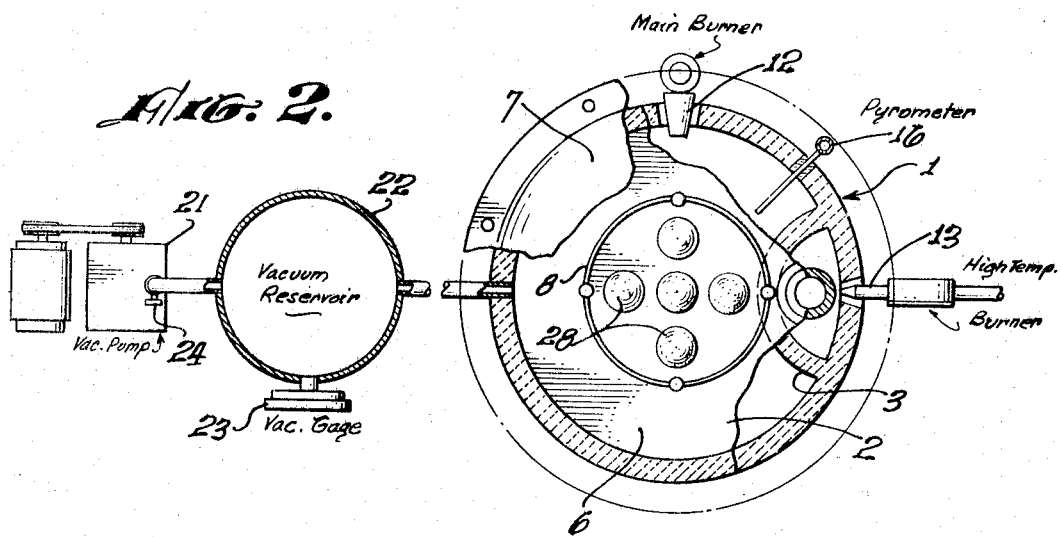

The apparatus shown in FIGS. 1 and 2 comprises a furnace indicated generally at 1, having bottom, side and top walls, and partition walls 2 and 3 dividing the interior of the furnace into a main burner chamber 4, a high temperature burner chamber 5, and a work receiving chamber 6. The top wall may be formed as a removable cover 7 to permit access to chamber 6 for introduction and removal of the work, that is, the metal members to be bonded.

Means for holding the work is shown as a basket 8 having work supporting shelves 9, which may be removably mounted within chamber 6 and may be hung from cover 7 or supported by resting on partition wall 2. A crucible 11 for holding a quantity of metal to be vaporized is mounted in the upper portion of chamber 5 with its open upper end communicating with the chamber 6.

The furnace is provided with a main burner 12 and a high temperature burner 13, located in chambers 4 and 5, respectively, and with openings 14 and 15 for escape of combustion produces from said chambers. The main burner 12 is positioned to heat the entire furnace including the work receiving chamber and the work therein, while burner 13 is positioned to heat crucible 11 to a temperature sufficient to vaporize the metal therein. Gas or other suitable fuel is supplied to burners 12 and 13. It will be understood that, if desired, suitable electrical heating means may be provided for heating the furnace and the crucible, instead of the burners 12 and 13. The furnace is also known as provided with a pyrometer 16 for indicating the temperature in the work receiving chamber 6.

The walls of the furnace are constructed of a suitable refractory, such as alumina, magnesite or chrome ore, (chromite), adapted to withstand the temperatures required in the operation as described hereinafter. The work supporting basket 8 and crucible 11 may also be of similar refractory material. The walls enclosing the work receiving chamber must be made substantially gas tight in order to permit creating and maintaing a partial vacuum therein as described hereinafter. During operation all joints, including the joints between the cover 7 and the furnace side wall and between the crucible 11 and the furnace walls, must be tightly closed by suitable refractory sealing material.

The work receiving chamber 6 is connected to a vacuum pump 21 for removing air to create the desired vacuum therein. A vacuum tank or reservoir 22 is preferably connected between said chamber and the pump, and is shown as provided with a gauge 23 for indicating the degree of vacuum therein and in chamber 6. A valve 24 is preferably provided in the line between the vacuum pump and reservoir, for shutting off the pump from chamber 6 during the vaporization and deposition of the bonding metal.

The metal screen shown in FIGS. 3 to 5 is formed by first winding together, in a spiral pattern, a flat metal strip 26 and a corrugated metal strip 27 to form a generally disc shaped screen indicated generally at 28, of the desired dimensions, and then bonding the strips together by the method of this invention. In making a preferred form of screen according to this invention, the strips 26 and 27 are of a corrosion resistant metal or alloy capable of withstanding high temperatures, such as a chrome-nickel alloy. Such alloys consist principally of nickel and chromium. Some of them also contain some iron and a small amount of manganese. As a specific example, the alloy may be one containing about 80% chromium and about 20% nickel.

Each of the metal strips is quite thin, for example, in the neighborhood of four to five thousandths of an inch thick. They are preferably, but not necessarily, of about equal thickness. The corrugated strip 27 may be made by crimping a flat strip to form a continuous series of small corrugations extending transversely across the width of the strip. For example, the pitch of the corrugations (indicated at $a$ in FIG. 5) may be about five hundredths of an inch, and the depth of the corrugations (indicated at $b$) may be approximately three hundredths of an inch.

The strips are wound together continguously so that the ridges formed by the corrugations of each turn of the corrugated strip are contiguous to the two adjacent turns of the flat strips, as indicated at 29 in FIG. 5. The screen structure thus formed has a thickness $c$ (in FIG. 4) equal to the width of the strips of which it is formed. It has a multiplicity of small openings 31 extending therethrough, and the two metal strips are contiguous to each other at a multiplicity of positions 29. Although the flat strip 26 has been wound into a spiral configuration, it may still be referred to as flat, since it is plain or free from surface irregularities.

The strips 26 and 27 may be of any suitable width (indicated at $c$ in FIG. 4), according to the desired thickness of the screen, and they may be wound together to form a screen of any desired diameter. The screen structure has an extended area transverse to the width of the strips. For the sake of simplicity, the intermediate turns of the strips are omitted in FIG. 3, the position of the flat strip being indicated by dotted lines. The width of the strips is considerably greater than their thickness, preferably more than ten times as great as the thickness, in order to provide, after bonding the strips together, a screen of relatively high strength and rigidity. Also, the preferred width of the strips may be varied in accordance with the diameter of the screen to be formed. For example, in making screens of say, 2 to 6 inches diameter, the strips may be about 1/8" to 1/4" in width, while in making screens of larger diameter it may be desirable to use strips of somewhat greater width in order to provide a screen of the desired thickness, strength and rigidity.

The two strips are then bonded together by a suitable bonding metal at their positions of contiguity, indicated at 29. In carrying out this bonding operation in accordance with the method of this invention, using the above described apparatus, one or more of the screens 28 are placed on the work supporting basket 8 and positioned in chamber 6 of the furnace, as shown in FIGS. 1 and 2. A suitable quantity of bonding metal is also placed in the crucible 11, as indicated at 33 in FIG. 1. The cover 7 is placed on the furnace, and all joints are tightly sealed to make said chamber substantially gas tight, as described above.

When the strips 26 and 27 are of chrome-nickel alloy, as in the above example, the metal used for bonding them together is preferably chromium, although other metals may be used for this purpose, as discussed more fully hereinafter. This bonding metal may be initially in any suitable physical form, such as pellets, wire, or strip.

The quantity of such bonding metal actually required to form strong bonds between the metal strips at their positions of contiguity is relatively small compared to the total weight of metal in the screens. In making screens of the structure described, the amount of bonding metal actually required to bond together the strips 26 and 27 at their positions of contiguity is on the order of only about one-tenth or less by weight of the screen or screens being bonded. However, during vaporization of the bonding metal as described hereinafter, a considerable quantity of it is lost by condensation on the walls of chamber 6 or on the work holding means 8, so that the weight of bonding metal placed in crucible 11 should generally be considerably in excess of the amount actually required for bonding, for example, about half the total weight of the screen or screens.

Air is then removed from the work receiving chamber 6 by operation of vacuum pump 21, with valve 24 open, until the desired degree of vacuum (subatmospheric pressure) is attained in said chamber and in the vacuum reservoir 22, as indicated by gauge 23. The valve 24 may then be closed momentarily. If the vacuum gauge shows a gradual increase in subatmospheric pressure, indicating in-leakage of air to chamber 6, any leaks should be located and additional sealing material applied, until the system is made sufficiently gas-tight to maintain the desired vacuum without significant in-leakage of air when valve 24 is closed. In order to greatly reduce the concentration or partial pressure of oxygen and other gases in chamber 6, the pressure therein is reduced to about .01 atmosphere or below, and preferably to about .001 atmosphere or below.

The furnace is heated by the main burner 12, to heat the walls of chamber 6 and the screens 28. The screens 28 are preferably heated to an operating temperature near but somewhat below the melting point of the metal of which they are formed, for example, to about 1200° to 1300° C., when using a chrome-nickel alloy having a melting point about 1350° C. The heating of the furnace may, if desired, be commenced during the evacuation of air from chamber 6 but the pressure in said chamber is preferably reduced to lower the partial pressure of oxygen as described above before the screens become very hot. This serves to minimize or prevent oxidation thereof when heated to the desired operating temperature, and thus maintain the metal surfaces substantially free of any oxide coating which would interfere with satisfactory bonding.

When the desired subatmospheric pressure for starting the bonding operation has been established and the screens are heated to the desired operating temperature, the high temperature burner 13 is turned on to heat the bonding metal at 33 as quickly as possible to a temperature sufficient to create a vapor pressure of said metal exceeding the subatmospheric pressure previously created in chamber 6, thus vaporizing said metal rapidly into chamber 6 and into the region surrounding the screens 28. The valve 24 should be closed before the bonding metal is heated sufficiently to cause appreciable vaporization, in order to prevent the bonding metal vapor from reaching the vacuum pump.

The bonding metal is preferably heated to a temperature sufficient to create a vapor pressure substantially greater than the starting vacuum in chamber 6. For example, if chromium is used as the bonding metal, and the pressure in said chamber prior to vaporization is .001 atmosphere or less, the chromium in crucible 11 may be heated to a temperature from about 1650° to about 1950° C. According to published data, the vapor pressure of chromium at temperatures within this range is about .002 to about .03 atmosphere, and is sufficient to cause rapid vaporization of the chromium.

When active vaporization starts and the hot metal vapor enters chamber 6, the pyrometer 16 will indicate a sudden increase in temperature, after which continued heating by high temperature burner 13 serves to complete the vaporization within a very short time, generally only one to a few minutes being required for this operation.

Prior to this vaporization of the bonding metal, the furnace has been heated by main burner 12, to maintain the screens 28 at a temperature below but preferably near their melting point as described above. However, the temperature of the screens is below the condensation temperature of the vaporized bonding metal and also below the melting point of the bonding metal. The chromium vapor entering the region surrounding the screens and coming into contact therewith, condense to liquid form on the surfaces of strips 26 and 27. For example, when the bonding metal is chromium and the vapor pressure created is within the above mentioned range of .002 to .03 atmosphere, the vapor will condense upon cooling to the corresponding condensation temperature within the range of 1650° to 1950° C. Since the melting point of chromium is about 1615° C., it will therefore condense in the form of a molten liquid on the surfaces of strips 26 and 27. It will be seen that the openings 31 provide for access of the metal vapor to all interior portions of the screen structure, so that it comes into contact with, and condenses on, the entire surface of the strips including surface portions at and near their positions of contiguity.

As is well known, due to surface tension or for other reasons, hot liquid metal on a clean hot metal surface has a strong tendency to flow very quickly to any small cracks, corners, or crevices, and to accumulate at such positions. As is shown particularly in FIG. 5, surfaces of the flat and corrugated strips 26 and 27 converge at an acute angle toward their positions of contiguity 29 to form angular pockets or crevices that extend for the entire width of the strips. Therefore, the liquid chromium deposited by condensation on the surface of strips 26 and 27 will flow rapidly to these angular pockets or crevices between the strips at their positions of contiguity 29, where it will accumulate and solidify on further cooling, to bond the strips firmly together at these positions and across substantially the full thickness of the screens, as indicated at 34 in FIGS. 4 and 5.

Due to the reduced partial pressure of oxygen and other gases in chamber 6, resulting from the removal of air to reduce the pressure therein a described above, there is little or no oxidation of the bonding metal, either during its heating in crucible 11, or while it is in vapor form, or during its condensation and solidification to bond the strips together. It will be seen, therefore, that this method serves to prevent or minimize oxidation of either the bonding metal or the metal members to be bonded, and also to prevent or minimize occlusion of oxygen or other gas in the bonding metal during its deposition and solidification, resulting in the production of strong and homogeneous bonds between the strips 26 and 27.

It should also be noted that the creation of a partial vacuum (reduced pressure) in the region surrounding the members to be bonded is of great advantage in substantially reducing the temperature required to vaporize the bonding metal. For example, as described above, if chromium is used as the bonding metal and the pressure in chamber 6 is within the range of .001 to .01 atmosphere, rapid vaporization is obtained at temperatures in the range of 1650° to 1950° C., while the boiling point of chromium at atmospheric pressure is approximately 2482° C.

The main burner 12 may be shut off at any time after the start of vaporization of the bonding metal. As soon as such vaporization is completed, the high temperature burner 13 is shut off. After allowing time for the furnace to cool sufficiently, the sealing material between the furnace cover and side walls is removed or loosened, the cover is removed, and the screens 28 are removed from the work holding means 8.

Although the bonds formed at 34 fill a small part of the openings 31 defined by the corrugations, the major portion of each of these openings remains open, so that the resulting screen structure has a multiplicity of small openings of substantially uniform size and shape, extending through it. By using very thin strips and very shallow closely spaced corrugations, screens may be produced having several hundred openings per square inch.

By means of the strong bonds produced adjacent each of the positions of contiguity of the strips and across the entire thickness of the screen, the resulting screens are very strong and rigid, particularly when the width of the strips is relatively large compared to their thickness and to the size of the openings. As noted above, the strips may be of any desired width, in order to produce a screen having any desired thickness in proportion to its diameter.

By using strips of metal having high resistance to corrosion, and also using a corrosion resistant metal such as chromium as the bonding metal, as described above, the screens so produced are capable of withstanding exposure to corrosive gases at elevated temperatures with little or no noticeable deterioration by corrosion.

These screens are therefore of advantage for application where they are subject to the influence of corrosive fluids at high temperatures, and also to high pressures or high fluid velocities, for example, as flame-arrestors for use with gas turbines, jet engines, or other applications in the power systems of aircraft or space vehicles.

FIG. 6 illustrates another example of a screen in accordance with this invention, comprising alternate flat and corrugated strips bonded together at positions of contiguity. In this example, a plurality of corrugated metal strips 37 are placed between closely spaced parallel sections of a flat metal strip 38, which may be a single continuous strip bent at intervals into the form shown. Each corrugated strip is contiguous to the two adjacent sections of the flat strips at the ridges of their corrugations, as indicated at 39. The strips are arranged to form a screen structure of the desired shape, for example, of rectangular shape as shown. In this example, the dimensions of the strips and the corrugations may be similar to those described above, and the screen structure may have any desired transverse dimensoins. The screen is shown on a somewhat enlarged scale, with intermediate portions broken away.

The strips may be bonded together at their positions of contiguity by means of a suitable bonding metal in the same manner as described above. As before, the strips are preferably formed of a corrosion resistant metal such as a chrome-nickel alloy, and the bonding metal is preferably also one that has a high resistance to corrosion, such as a chromium. This form of screen also has a multiplicity of small openings 40 extending through it. It has advantageous characteristics smiliar to the form of screen first described, and is useful for similar purposes in cases where a screen of rectangular or other non-circular shape is desired.

In addition to the bonding of metal strips to produce screens as described above, the method of the present invention may be used advantageously for bonding together two or more contiguous metal members of various forms such as strips, wires, or thin metal tampings, to produce other useful articles. It is particularly advantageous in cases where it is desired to bond two or more metal members or parts together at a multiplicity of contiguous positions which are not readily accessible for application of tools, bonding materials, or treating means such as are required in other known bonding methods. In any of these applications, the method may be carried out by placing the contiguous members to be bonded in an enclosed space such as chamber 6, removing air from the region surrounding such members to reduce the partial pressure of oxygen and other gases, heating the members to a temperature below their melting point, heating the desired boding metal to a temperature suffiicent to vaporize it into the enclosed space, and bringing the vaporized bonding metal into contact with the metal members to cause condensation and solidification of the bonding metal to bond the members together at their positions of contiguity, all in substantial the same manner as described above.

This bonding method may also be used for bonding members formed of various other metals instead of the chrome-nickel alloys mentioned above, and various other metals may also be used as the bonding metal instead of chromium. However, the metal to be bonded and the metal used for bonding should be bondingly compatible, that is, their normal crystal structures should be such that the bonding metal will form a good bond with the metal members to be bonded when the liquid bonding metal deposited by condensation solidifies in contact with said members.

Some examples of metals that can be used for bonding metal members in accordance with this method, and of different metals that can be bonded together with each of these bonding metals, are listed in the following table, which also shows the melting point and boiling point of each of the bonding metals, as given in "Handbook of Chemistry and Physics," 40th edition (1958–59), published by Chemical Rubber Publishing Company.

| Bonding metals | Melting point (° C.) | Boiling point (° C.) | Metals to be bonded |
| --- | --- | --- | --- |
| Chromium | 1,615 | 2,482 | Chromium, chrome nickel alloys, stainless steel, other alloys of chromium, nickel or alloys thereof, copper or alloys thereof. |
| Copper | 1,083 | 2,595 | Steel, copper or alloys thereof, nickel or alloys thereof. |
| Aluminum | 660 | 2,056 | Steel, aluminum or alloys thereof, copper or alloys thereof, copper-clad steel, magnesium. |
| Cadmium | 320 | 765 | Steel or other ferrous alloy, nickel or alloys thereof, copper or alloys thereof, silver, magnesium, aluminum. |
| Nickel | 1,452 | 2,732 | Steel or other ferrous alloys, nickel or alloys thereof, nickel plated metals. |
| Lead | 327 | 1,744 | Iron or alloys thereof, copper or alloys thereof. |
| Silver | 961 | 2,212 | Silver, silver plated metals. |
| Tin | 232 | 2,270 | Copper or alloys thereof, steel. |
| Zinc | 419 | 907 | Do. |
| Iron | 1,525 | 2,735 | Steel or other ferrous alloys. |

As a general rule, when using any of the above metals, if the pressure in the region surrounding the metal members to be bonded has been reduced to between .001 to .01 atmosphere prior to vaporization of the bonding metal, rapid vaporization thereof can be obtained by heating it to between about 70% and about 80% of its absolute boiling temperature. In the case of chromium, these values correspond approximately to the above mentioned vaporizing temperature range of about 1650° C. to about 1950° C. By way of further examples, a satisfactory vaporizing temperature range is about 1350° C. to about 1600° C. when aluminum is used as the bonding metal, and about 450° C. to about 550° C. when using cadmium. These values correspond approximately to 70% and 80%, respectively, of the absolute boiling points of these metals. In each case, the lower temperature given will create a vapor pressure well above .001 atmosphere, and the higher temperature given will create a vapor pressure well above .01 atmosphere.

In all cases, the metal members to be bonded are placed in an enclosed space, and air is removed therefrom to reduce the pressure to about .01 atmosphere or below, and preferably to about .001 atmosphere or below, in order to reduce partial pressure of oxygen and other gases in the region surrounding the metal members, and the metal members are heated to a temperature below their melting point. The temperature to which these members are heated will depend to some extent on the properties of the metal used for bonding the members together. When chromium is used for bonding members formed of a chrome nickel alloy as in the example first described above, the members are preferably heated to a temperature near but below the melting point of the alloy. However, when a lower melting metal such as cadmium is used as the bonding metal, the temperature to which the metal members are heated should be somewhat below the melting point of the bonding metal so that the latter will condense to liquid form and then solidify in contact with the metal members to bond them together.

When the method is used to produce products having high resistance to corrosion at high temperatures, such as screens of the type described above and illustrated in FIGS. 3 to 6, combinations of corrosion resistant metals, other than the combination of chrome nickel alloy and chromium mentioned in the above examples may be used. For example, when the metal members are of chrome nickel alloy, either nickel or cadmium can be used as the bonding metal. Other examples of suitable combinations include stainless steel members with chromium, nickel, or cadmium as the bonding metal, or chrome plated members with either chromium or nickel as the bonding metal.

I claim:

1. The method of binding metal members that comprises creating a subatmospheric pressure in a region surrounding contiguous metal members to be bonded, and introducing heated vapor of a bonding metal into said region and into contact with said members while maintaining said members at a temperature such as to cause said bonding metal vapor to condense the liquid form on the surfaces of said members and then to solidify in contact with said members and bond them together.

2. The method as set forth in claim 1, in which the subatmospheric pressure created in said region is below about .01 atmosphere.

3. The method as set forth in claim 1 in which the subatmospheric pressure created in said region is in the neighborhood of .001 atmosphere.

4. The method of bonding metal members that comprises placing contiguous metal members to be bonded in an enclosed space, exhausting air from said enclosed space to create a subatmospheric pressure therein, and heating a bonding metal in said enclosed space to a temperature sufficient to create a vapor pressure at least equal to said subatmospheric pressure and thereby vaporize said metal into said space and into contact with said metal members, while maintaining said members at a temperature such as to cause said bonding metal vapor to condense in liquid form on the surfaces of said members and then to solidify in contact with said members to bond them together.

5. The method as set forth in claim 4, in which said metal members are of corrosion resistant metal, and the bonding metal is also resistant to corrosion.

6. The method as set forth in claim 4, in which said metal members are of a chrome nickel alloy, and the bonding metal is chromium.

7. The method of bonding metal members that comprises placing metal members to be bonded in an enclosed space with said members disposed contiguous to each other at a multiplicity of positions, exhausting air from said enclosed space to create a subatmospheric pressure therein, and heating a bonding metal in said enclosed space to a temperature sufficient to create a vapor pressure at least equal to said subatmospheric pressure and thereby vaporize said metal into said space and into contact with said metal members, while maintaining said members at a temperature such as to cause said bonding metal vapor to condense in liquid form on the surfaces of said members and then to solidify in contact with said members adjacent their positions of contiguity and bond them together.

8. The method of bonding metal members that comprises heating contiguous metal members to be bonded to a temperature below the melting point thereof in a region of subatmospheric pressure; heating a bonding metal to a temperature sufficient to vaporize it and create a vapor pressure at least equal to the subatmospheric pressure in said region; bringing the resulting metal vapor into contact with said metal members in said region while maintaining said members at a temperature below the melting point of said bonding metal and while substantially excluding admission of air into said region to maintain therein a low concentration of oxygen and other gases, to cause said bonding metal vapor to condense in liquid form on the surfaces of said metal members and then to solidify in contact with said members and bond them together.

9. The method as set forth in claim 8, in which said metal members are of a chrome nickel alloy and said bonding metal is chromium.

10. The method as set forth in claim 8, in which a subatmospheric pressure on the order of .001 atmosphere is created in said region prior to introduction of the bonding metal vapor into said region, and the bonding metal is heated to a temperature sufficient to create a vapor pressure substantially greater than said subatmospheric pressure.

11. The method of making a screen that comprises placing flat and corrugated thin metal strips in alternate relation to each other and contiguous to each other at the ridges formed by the corrugations, said ridges extending transversely across the width of the strips, to form a structure having an extended surface transverse to the width of the strips and having a multipliciy of openings extending therethrough; creating a subatmospheric pressure in a region surrounding said structure; and introducing a heated vapor of a bonding metal into said region and into contact with said structure while maintaining said structure at a temperaure such as to cause said bonding metal vapor to condense to liquid form on the surfaces of said strips and then to solidify in contact with said strips and bond them together adjacent their positions of contiguity.

12. The method of making a screen that comprises winding together in spiral form alternately disposed flat and corrugated thin flat metal strips, said corrugated strips having corrugations extending transversely across its width, and said strips being wound together with the flat strip contiguous to the corrugated strip at the ridges formed by the corrugations, to form a structure having an extended surface transverse to the width of the strips and having a multiplicity of openings extending therethrough; creating a subatmospheric pressure in a region surrounding said structure; and introducing a heated vapor of a bonding metal into said region and into contact with said structure while maintaining said structure at a temperature such as to cause said bonding metal vapor to condense to liquid form on the surfaces of said strips and then to solidify in contact with said stirps and bond them together adjacent their positions of contiguity.

References Cited

UNITED STATES PATENTS

| 1,806,738 | 5/1931 | Burns et al. | 29—498 X |
| 2,934,820 | 5/1960 | Novak et al. | 29—504 X |
| 3,060,561 | 10/1962 | Watter | 29—455 X |
| 3,208,131 | 9/1965 | Ruff et al. | 29—460 X |
| 3,365,787 | 1/1968 | Forsberg et al. | 29—471.1 |

JOHN F. CAMPBELL, Primary Examiner

J. L. CLINE, Assistant Examiner

U.S. Cl. X.R.

29—494, 496